Patented Aug. 1, 1933

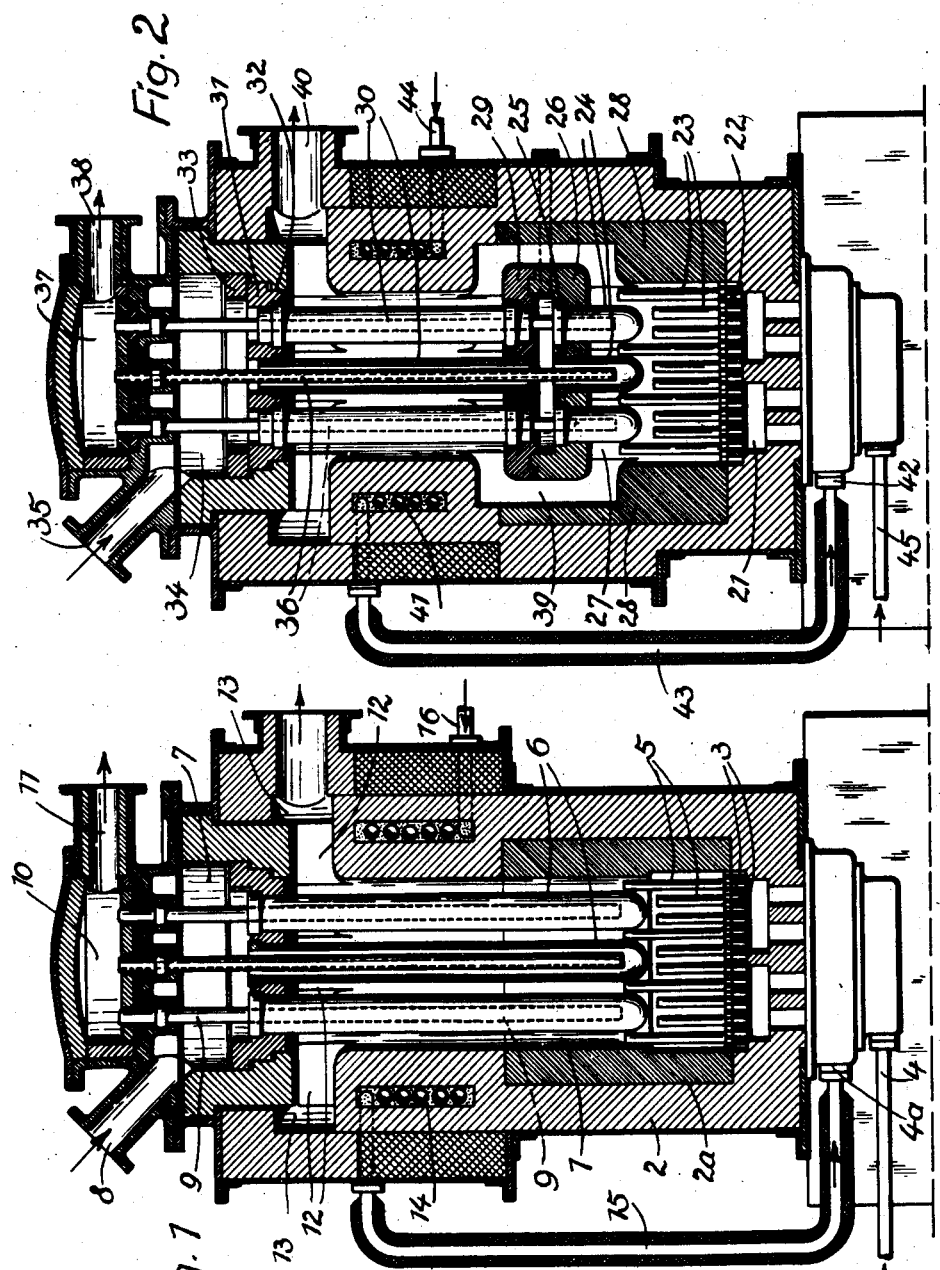

1,920,632

UNITED STATES PATENT OFFICE 1,920,632

CONTRIVANCE FOR CARRYING OUT GAS REACTIONS AT HIGH TEMPERATURES

Joseph Daniels, Essen-Ruhr, Germany, assignor, by mesne assignments, to The Koppers Company of Delaware, Pittsburgh, Pa., a Corporation of Delaware Application August 3, 1931, Serial No. 554,822, and in Germany August 5, 1930.

6 Claims. (Cl. 23—277)

The invention relates to the conversion of gases at high temperatures in a contrivance in which the gases to be treated are brought into contact with surfaces of bodies heated up to high temperatures, said bodies consisting of any suitable material, preferably of ceramic material. Such contrivances are used for instance for the conversion of methane by means of steam, whereby the surface of the ceramic material is heated up to about 2000° C.

Up to the present, the heating of these wall surfaces has been carried out in such a manner that after shutting off the flow of the gases to be treated in the reaction compartment of the contrivance a combustible gas is introduced which burns with air inside the reaction chamber and gives up the heat directly to the wall surfaces of the ceramic bodies. The apparatus which up to the present have been constructed according to this principle, however, have the great disadvantage that they can only be worked intermittently so that the capacity of these apparatus is indeed small in proportion to the room required for same.

The object of the present invention is improvements in the said contrivances for the carrying out of gas reactions which permit of the conversion being effected continuously. The invention follows the essential idea to use as highly heated reaction surfaces for the conversion of the gas, the inner wall of tubes consisting of a highly refractory material as for instance tubes made of sillimanite through which tubes the gases to be treated are passed whereas the heating up of the reaction tubes is effected from the outside and this by means of hot gases which are consumed directly without the production of a flame underneath the reaction tubes. According to the invention the reaction tubes over which the heating gases pass along in this case are on the one side closed, whereas the passing off of the gases employed for the reaction is effected by an inner tube which reaches almost to the closed end of the reaction tubes, and further the hot gases are set in motion in counter-current to the reaction gas.

A further object of the invention is improvements in the tubes for the above mentioned reaction which make it possible to bring the wall temperatures to 2000° C. and over. For this purpose, the reaction tubes through which the gases to be converted are pasesd, are according to this invention formed in two parts, whereby the lower one sided closed section of the reaction tubes is made of a tube from calcined magnesium, the upper one on the other end consisting of a tube open on both sides, which is made of another refractory material for instance sillimanite, and both the halves of the tubes are fixed on a capsule like connecting piece fitted in the heating chamber. According to the invention the lower magnesium tubes at their open end are preferably provided with a flange and suspended in suitable recesses in the bottom of the connecting piece.

A further peculiarity of the contrivance according to this invention consists in that the upper sections of the reaction tubes grip above in the recesses of an upwardly sliding cover similar to a sieve in the oven chamber.

The contrivance according to the invention shows an oven chamber closed on one side and lined with material which is a relatively poor conductor of heat on the bottom of which chamber the flameless combustion of the gases takes place and in the interior of which the reaction tubes closed below reach forward from the roof to almost the top of the combustion zone. Thereby the reaction tubes are preferably attached to fittings arranged on the roof of the oven which are combined to form a metal head, which preferably is kept hot by the waste gases escaping from the oven chamber so that the condensation of the steam or other components of the gas in the gas conducting pipe lines and in the fittings of the reaction tubes are avoided.

Should the reactions which have to be carried out in the contrivance according to this invention have to be effected by the use of catalysator, then the latter are arranged according to the invention on the inside of the reaction tube preferably on their lower end.

On the drawing in Fig. 1 a contrivance constructed is shown for the carrying out of the gas reaction at high temperatures according to the invention.

Fig. 2 shows another form of contrivance for carrying out the invention.

In the case of the contrivance shown in Fig. 1 of the drawing an oven chamber is surrounded on all sides with a material 2 which is a relatively poor conductor of heat and which is lined on its inner surfaces with highly refractory brickwork 2a. On the bottom of the oven chamber openings 3 are provided for the admitting the gas which connect up the oven chamber 1 with the heating gas channel 4 and the air pipe line 4a. On the bottom of the oven chamber there are provided small tubes 5 made of magnesia material or the like which render possible the combustion without flame arising from the heating gases introduced from below into the oven chamber.

From the oven roof there projects into the interior down to nearly the combustion tubes 5 a bundle of highly refractory tubes 6 arranged vertically, which for instance consist of sillimanite and in which the cracking reaction is carried out. These reaction tubes are above connected up with an ante-chamber 7 into which the gases to be treated, for instance a mixture of methane and steam, are introduced through the channel 8, as will be later described. The ante-chamber 7 is heated up preferably so highly through the waste gases from the oven chamber that on the one hand any condensation of the steam in same does not take place, on the other hand, however, that there is not effected a cracking of the methane in the ante-chamber.

The gases to be treated stream from the ante-chamber through the reaction tubes from above downwards, and are drawn off at the lower closed end of the tube through run-off pipe lines 9 arranged in the interior of same, which are preferably made of a comparatively thin wall consisting of quartz. These inner outlet tubes open out into a gas collecting chamber 10 provided at the upper end of the oven from which the gases can be withdrawn through the opening 11. The tubes 9 pass through the ante-chamber 7 so that the gases in same come into contact with the hot tube walls.

In the case of the contrivance shown, the hot gases produced in the lower part of the oven by the flameless combustion stream upwards along the tubes 6 in counter-current to the fresh reaction gases introduced in same and are drawn off from the oven through the outlets 12 which are provided at the upper end of the oven chamber and open out into the ring channel 13.

For heating up the combustion air, there are provided recuperator tubes 14 in the side walls of the oven chamber, said recuperator tubes being connected up by means of an insulated pipe 15 with the air inlet 4, arranged at the bottom of the oven chamber. Air is led to the recuperator through the pipe line 16 which is connected up with any suitable blower not shown, however, in the drawing.

The quantity of gas passing through is determined in the case of the contrivance according to the invention by the width of the suspended inner tubes and the gas pressure employed, whereas the quantity of heating gas made use of rules the measure of the heat conducted.

Another way in which the invention may be carried out is shown in the drawing in Fig. 2, whereby the heating gases are led through the bottom of a preferably cylindrically shaped cracking oven. The combustion gases pass then through a mixing chamber 21 and are burned above the roasting plates 22 above same are arranged one row of small tubes 23 made preferably of magnesia or the like through which a flameless combustion of the gas mixture is obtained. The gas distributing tubes 23 which are of various lengths reach down to the lower sections 24 of the reaction tubes through which there is conducted the gas or the gas mixture to be treated. These lower sections of the reaction tubes consist of burnt magnesia. They are provided at their upper ends with a flange 25 turned outwards and are suspended in suitable openings of the bottom 26 of a capsule shaped connecting body which rests on support 27 of the refractory brickwork 28 of the oven lining. The cover 29 of the connecting piece has recesses in the line of the lower reaction tubes sections in which recesses the upper sections 30 of the reaction pipe lines which are preferably made of sillimanite, are set. At their upper end the tube sections 30 are supported in suitable recesses in a plate 31 which rest in an upper recess 32 of the oven in such a way that they are able to glide upwards so that they can move in an upward direction according as the sillimanite tubes expand in consequence of the heating. On the support plate 31 there are provided edges suitable to assure there being tight, resting on the packing ring 33 which likewise can be glided vertically.

The cover recess 32 widens out upwards to an ante-chamber 34 in which the gas bringing about the reaction is led through the pipe line 35 and out of which the gas is uniformly distributed to all the reaction pipes. The leading off of the reaction gases out of the reaction tubes is effected likewise as in the principal patent through the pipes 36 which are suspended in the reaction tubes and which are hung up on the roof of the ante-chamber 34, which reach almost to above the bottom of the magnesia pipe. The inner pipes 36 open out like the reaction pipes in a second gas chamber 37 from which the reaction gases are drawn off through the pipe line 38.

In running the oven, the heating gases after having burnt below the magnesia tubes, go into ring shaped channel 39 surrounding the connecting body and then pass along the upper section 22 of the reaction tubes.

The waste gases finally pass off at the point 40 out of the fire box. The combustion air required for the firing can, with advantage, be preheated in recuperator tubes 41 arranged in the oven lining and connected up with the air inlet 42 at the bottom of the oven by means of an insulated pipe line 43. Air is led to the recuperator tubes 11 through the pipe 44 while the heating gases are fed through the pipe line 45.

The invention as hereinabove set forth is embodied in a particular form of construction, but may be variously embodied within the scope of the claims hereinafter made.

I claim:

1. Apparatus for carrying out gas reactions at high temperatures comprising: an oven chamber having an outer enclosing wall of refractory material of relatively poor heat conductivity; a plurality of reaction tubes of highly refractory material and of relatively high heat conductivity extending downwardly into said oven chamber and closed to said chamber; gas offtake conduits within said tubes and communicating therewith for off-flow upwardly through said conduits of the reaction products from said tubes; means for leading gas to be treated into the tubes between the same and the conduits therein for flow downwardly to the lower end of the tubes; flameless combustion means for maintaining continuous passage of combustion gas of substantially flameless combustion in direct contact with the outer bottoms of said tubes; and gas off-flow means for flowing of said hot combustion gases in contact with the outer surfaces of the tubes substantially throughout their lengths.

2. Apparatus for carrying out gas reactions at high temperatures comprising: an oven chamber having an outer enclosing wall of refractory material of relatively low heat conductivity; a plurality of reaction tubes of highly refractory material of relatively high heat conductivity extending downwardly into said oven chamber, each of said tubes comprising an upper section and a lower section, the lower section consisting of material of higher refractory material than that of the upper section; a connecting chamber of refractory material connecting said sections with a connecting gas space therebetween, said tubes and said connecting chamber being closed to said oven chamber; reaction gas offtake conduits extending into said tubes and terminating in communication with said tubes adjacent the lower portions of the lower sections thereof; means for introducing gas to be treated into the tubes at the upper parts thereof between said gas offtake conduits and the tubes for flow downwardly therein; flameless combustion means for maintaining continuous passage of combustion gases of substantially flameless combustion in direct contact with the outer bottoms of the lower sections of said tubes; and gas offtake means for flowing said combustion gases directly alongside the outer surfaces of the upper sections of the tubes, whereby to maintain said reaction at a very high heat.

3. Apparatus for carrying out gas reactions at high temperatures comprising: an oven chamber having an enclosing wall of refractory material of relatively poor heat conductivity; reaction tubes of highly refractory material of relatively high heat conductivity extending downwardly into said oven chamber and closed thereto; reaction gas-offtake conduits extending into said tubes and communicating with the lower ends thereof for upflow of reaction products; means for flowing gas to be treated downwardly in the space between said tubes and the conduits therein; and gas combustion heating means for heating and maintaining said tubes at very high temperatures throughout their height by passage of combustion gas in direct contact with the outer surfaces of said tubes throughout their height.

4. A device as set forth in claim 3, wherein the gas combustion heating means for heating the reaction tubes from the outside comprises gas burners below the lower end of the reaction tubes, said burners being fitted with means for effecting flameless combustion.

5. A device as set forth in claim 3, wherein the gas combustion heating means for heating the reaction tubes from the outside comprises gas burners below the lower end of the reaction tubes, and above said burners tubes of refractory material are arranged, close to one another so as to effect a flameless combustion.

6. Apparatus for carrying out gas reactions at high temperatures comprising: an oven chamber having an enclosing wall of refractory material of relatively poor heat conductivity; reaction tubes of highly refractory material of relatively high heat conductivity extending downwardly into said oven chamber and closed thereto; reaction gas-offtake conduits extending into said tubes and communicating with the lower ends thereof for upflow of reaction products; means for flowing gas to be treated downwardly in the space between said tubes and the conduits therein; and gas combustion heating means for heating and maintaining said tubes at very high temperatures throughout their height by passage of combustion gas in direct contact with the outer surfaces of said tubes throughout their height; and means for preheating the air for said gas combustion heating means by the heat in the oven chamber wall opposite the upper portions of said tubes.

JOSEPH DANIELS.